United States Patent
Khoryaev et al.

(10) Patent No.: US 8,477,690 B2
(45) Date of Patent: Jul. 2, 2013

(54) LOCATION DETERMINATION IN WIRELESS COMMUNICATION SYSTEMS

(75) Inventors: Alexey Khoryaev, Dzerzhinsk (RU); Alexander Maltsev, Nizhny Novgorod (RU); Kamran Etemad, Potomac, MD (US); Roman O. Maslennikov, Nizhny Novgorod (RU); Mikhail A. Shilov, Nizhny Novgorod (RU); Yang-Seok Choi, Portland, OR (US); Andrey Chervyakov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 352 days.

(21) Appl. No.: 12/844,435

(22) Filed: Jul. 27, 2010

(65) Prior Publication Data

US 2011/0110338 A1 May 12, 2011

Related U.S. Application Data

(60) Provisional application No. 61/259,086, filed on Nov. 6, 2009.

(51) Int. Cl.
*H04W 4/00* (2009.01)
*H04W 24/00* (2009.01)

(52) U.S. Cl.
USPC .................................... 370/328; 455/456.1

(58) Field of Classification Search
USPC .............................. 370/328; 455/456.1–456.6
See application file for complete search history.

(56) References Cited

U.S. PATENT DOCUMENTS

| 2006/0050625 A1* | 3/2006 | Krasner ..................... 370/208 |
| 2006/0105776 A1 | 5/2006 | Burke |
| 2007/0121560 A1* | 5/2007 | Edge ......................... 370/338 |
| 2007/0232324 A1 | 10/2007 | Kim et al. |
| 2008/0261623 A1* | 10/2008 | Etemad et al. ............. 455/456.2 |
| 2012/0190381 A1* | 7/2012 | Choi et al. ................ 455/456.1 |

FOREIGN PATENT DOCUMENTS

| DE | 10101292 A1 | 7/2002 |
| EP | 0568824 A2 | 11/1993 |
| EP | 2239913 A1 | 10/2010 |
| JP | 2008-537387 A | 9/2008 |
| JP | 2009-515201 A | 4/2009 |
| JP | 2011-101362 A | 5/2011 |
| WO | 2007/067007 A1 | 6/2007 |
| WO | 2011/019357 A1 | 2/2011 |

OTHER PUBLICATIONS

Office Action Received for GB Patent Application No. GE1018663.3, mailed on Dec. 1, 2011, 1 page.

(Continued)

*Primary Examiner* — Paul H Masur
(74) *Attorney, Agent, or Firm* — Cool Patent, P.C.; Kenneth J. Cool; Joseph P. Curtin

(57) ABSTRACT

Briefly, in accordance with one or more embodiments, a mobile station receives a location beacon transmitted from multiple base stations based on a transmission plan for a predefined downlink location based services zone in the superframes of a signal frame structure. The transmission plan includes spreading transmissions of the location beacon that are unique to respective base stations. The mobile station identifies the base stations based on the respective location beacons and the transmission plan. The mobile station identifies a present location based on the location beacons and the identities of the base stations that from which the location beacons were received.

27 Claims, 7 Drawing Sheets

OTHER PUBLICATIONS

Office Action Received for Japanese Patent Application No. 2010-248604, Mailed on Jul. 3, 2012, 2 pages of Office Action and 3 pages of English Translation.

Search Report received for GB Patent Application No. GB1018663.3, mailed on Mar. 3, 2011, 4 pages.

Foy, Wade H., "Position-Location Solutions by Taylor-Series Estimation", IEEE Transactions on Aerospace and Electronic Systems, Mar. 1976, vol. AES-12, Issue 2, pp. 187-194.

Sayed, et al., "Network-Based Wireless Location", Signal Processing Magazine, IEEE, Jul. 2005, vol. 22, Issue 4, pp. 24-40.

Khoryaev, et al., "Proposed Text on Enhanced LBS Support in Downlink for the IEEE 802.16m AWD", Broadband Wireless Access Working Group, May 13, 2010, 8 pages.

Chan, et al., "A Simple and Efficient Estimator for Hyperbolic Location", IEEE Transactions on Signal Processing, vol. 42, Issue 8, Aug. 1994, pp. 1905-1915.

Office Action Received for German Patent Application No. 102010049315.5 Mailed on Sep. 20, 2012, 8 pages of Office Action and 5 pages of English Translation.

* cited by examiner

LOCATION DETERMINATION IN WIRELESS COMMUNICATION SYSTEMS

CROSS-REFERENCE TO RELATED APPLICATIONS

The present application claims the benefit of U.S. Provisional Application No. 61/259,086 filed Nov. 6, 2009. Said Application No. 61/259,086 is hereby incorporated herein by reference in its entirety.

BACKGROUND

Location Based Services (LBS) are a type of services provided to the subscriber based on geographical position. LBS applications include emergency services, navigation, asset tracking, workforce management, location-based events, location-based advertisement, location-based search, and so on. LBS services are expected to grow in the upcoming years. In the US, the wireless E911 service requires operators to report the location of the subscriber making the 911 call with the accuracy of 50 m for 67% of the calls and 150 m for 95% of the calls for handset-based solutions, and 100 m for 67% of the calls and 300 m for 95% of the calls for network-based solutions. The wireless E911 accuracy requirements are usually taken as general accuracy requirements for all types of LBS services. These requirements are mandated by legislation and, at the same time, they are quite stringent to meet the needs of other LBS applications. Worldwide Interoperability for Microwave Access (WiMAX) networks, as well as any other cellular network providing voice services, such as Voice over IP (VoIP) services, need to be compliant with the wireless E911 requirements and be able to provide the location of the user making the 911 call with the specified accuracy. Currently, there are two main technical approaches that may be used to determine the position of the user in a cellular network. The first approach exploits existing global navigation satellite systems (GNSS), for example, the Global Positioning System (GPS) to estimate the position of the user. GNSS-based positioning may be augmented by network assistance, such as Assisted-GNSS or Assisted-GPS. GNSS-based positioning is an effective method, however, it involves installation of a GPS receiver in the communication device, which makes the device more expensive, and furthermore GPS receivers have poor performance in indoor environments where the direct link to a satellite may be blocked. The second approach involves a user having a communication device positioned via the wireless communication network. In this approach, location parameters are extracted from the signal transmitted over the air. Existing communication systems may rely on the following signal processing techniques for user positioning: Angle of Arrival (AOA) estimation, time difference of arrival (TDOA) estimation, time of arrival (TOA) estimation, received signal strength indicator (RSSI) measurements, and so on. A majority of the deployed cellular systems, such as Global System for Mobile Communications (GSM), WiMAX, and/or Long Term Evolution (LTE), uses TDOA-based positioning as a baseline method for user location. This approach is technically simple and effective since it involves synchronization only between base stations of the cellular networks and does not require time synchronization of different mobile stations.

The TDOA method can be implemented in both downlink (D-TDOA) and uplink (U-TDOA). The D-TDOA positioning method measures the difference of time of arrival for signals coming to the positioned mobile station (MS) from multiple base stations (BSs), typically at least three or more. To accomplish such measurements, known training signals, such as preambles or other reference signals (e.g., MIMO-midamble, common pilots or cell-specific reference signals or special positioning reference signals), are transmitted from the BSs to the MS at exactly known time instants. TDOA estimates for different BS pairs are measured and the MS position can be calculated using a trilateration algorithm. From a physical (PHY) layer perspective, the main problem for D-TDOA location is to accurately measure relative time delays (TDOAs) for multiple neighboring BSs in a severe multipath and interference environment. In a deployed communication system, such as a WiMAX network, these measurements may be performed using some training signals. In the IEEE 802.16-2009 and IEEE 802.16m standards (IEEE—Institute for Electrical and Electronics Engineers), preamble signals are considered as an appropriate candidate for performing D-TDOA measurements. In addition in the IEEE 802.16m standard, the MIMO-midamble can be used for the measurements of signal location parameters as well. Both of these signals are different for different sectors and correspondingly BSs of network and are designed to have good cross and auto-correlation properties. Both signals have three orthogonal subsets transmitted on different subcarrier sets that improve cross-correlation properties due to orthogonal transmission. The preamble signals mainly serve for the purpose of frame synchronization and the MIMO-Midamble is mainly designed for the purpose of MIMO channel measurements. Both of these signals are transmitted at the beginning of each frame may have an additional function of being D-TDOA sounding signals. Despite many aforementioned advantages of the preamble physical structure in WiMAX IEEE 802.16m, there are, however, also some limitations associated with their exploitation for the purposes of the D-TDOA positioning. For example, all preamble and MIMO-Midamble signals are transmitted at the same time and are repeated in every frame using the same signal sequence. Hence, in the interference-limited scenario, coherent combining of the received useful signal will also include coherent combining of the same realization of interfering signals, and accumulation of the signals over multiple frames will not allow improving the signal-to-interference ratio (SIR) of the system, but only the signal-to-noise ratio (SNR). Therefore, in such environments, location accuracy of the D-TDOA method using the preambles will be saturated at some level. For typical hexagonal deployment with three-sector BSs, the D-TDOA location accuracy of the IEEE 802.16m system in the case of using standard preamble signals only allocated at the beginning of each frame may not achieve the stringent accuracy requirements of the wireless E911 service because of the interference between different cells. Hence, to improve the accuracy the other training signals have to be used. The transmission of such signals may be coordinated between different BSs to improve severe interference environment that exists during transmission of the preamble or MIMO-midamble signals.

DESCRIPTION OF THE DRAWING FIGURES

Claimed subject matter is particularly pointed out and distinctly claimed in the concluding portion of the specification. Such subject matter, however, may be understood by reference to the following detailed description when read with the accompanying drawings in which:

Figure 6:
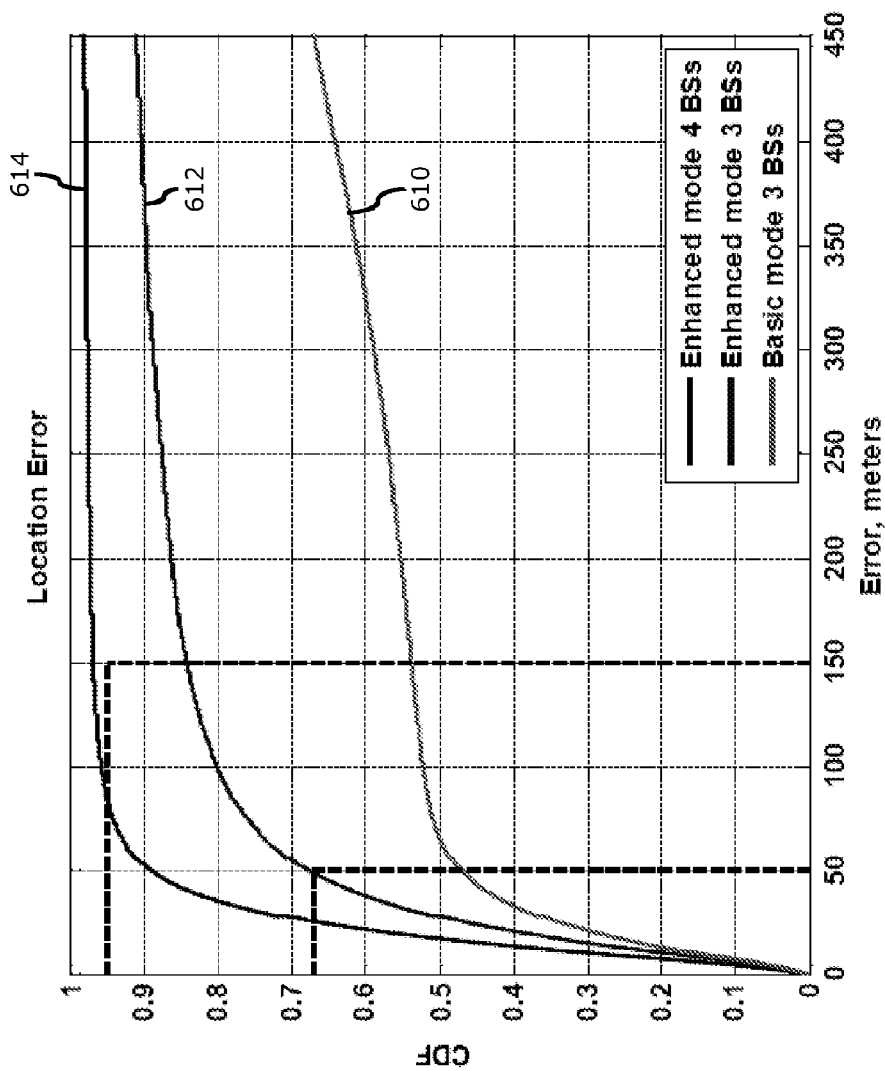
Figure 7:
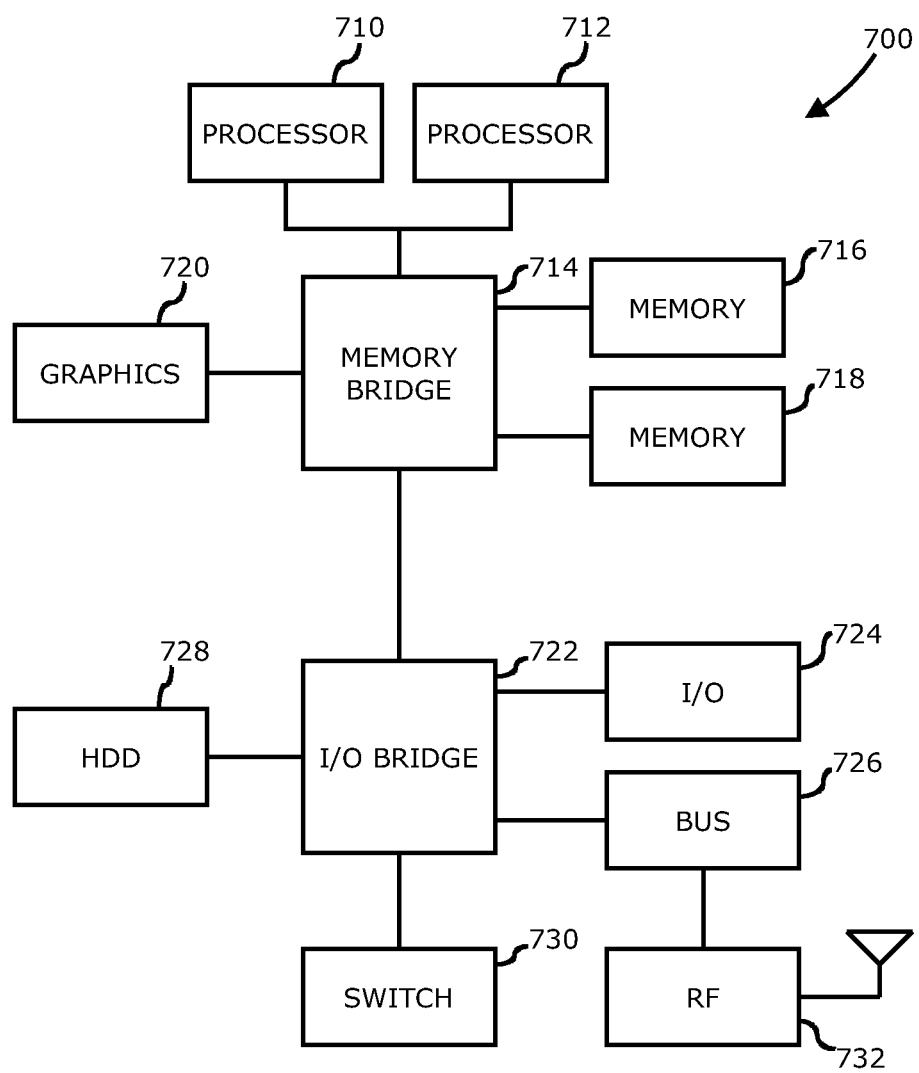

FIG. 6 is a diagram of a comparison of D-TDOA location performance based on SA-preamble signal processing and using a Downlink Location Based Services (D-LBS) zone with location beacons in accordance with one or more embodiments; and FIG. 7 is a block diagram of an information-handling system capable of implementing a Downlink Location Based Services (D-LBS) zone for location based services in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. It will, however, be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. Coupled may, however, also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. "Over" may, however, also mean that two or more elements are not in direct contact with each other. For example, "over" may mean that one element is above another element, but not contact each other and may have another element or elements in between the two elements. Furthermore, the term "and/or" may mean "and," it may mean "or," it may mean "exclusive-or," it may mean "one," it may mean "some, but not all," it may mean "neither," and/or it may mean "both," although the scope of claimed subject matter is not limited in this respect. In the following description and/or claims, the terms "comprise" and "include," along with their derivatives, may be used and are intended as synonyms for each other.

Figure 1:
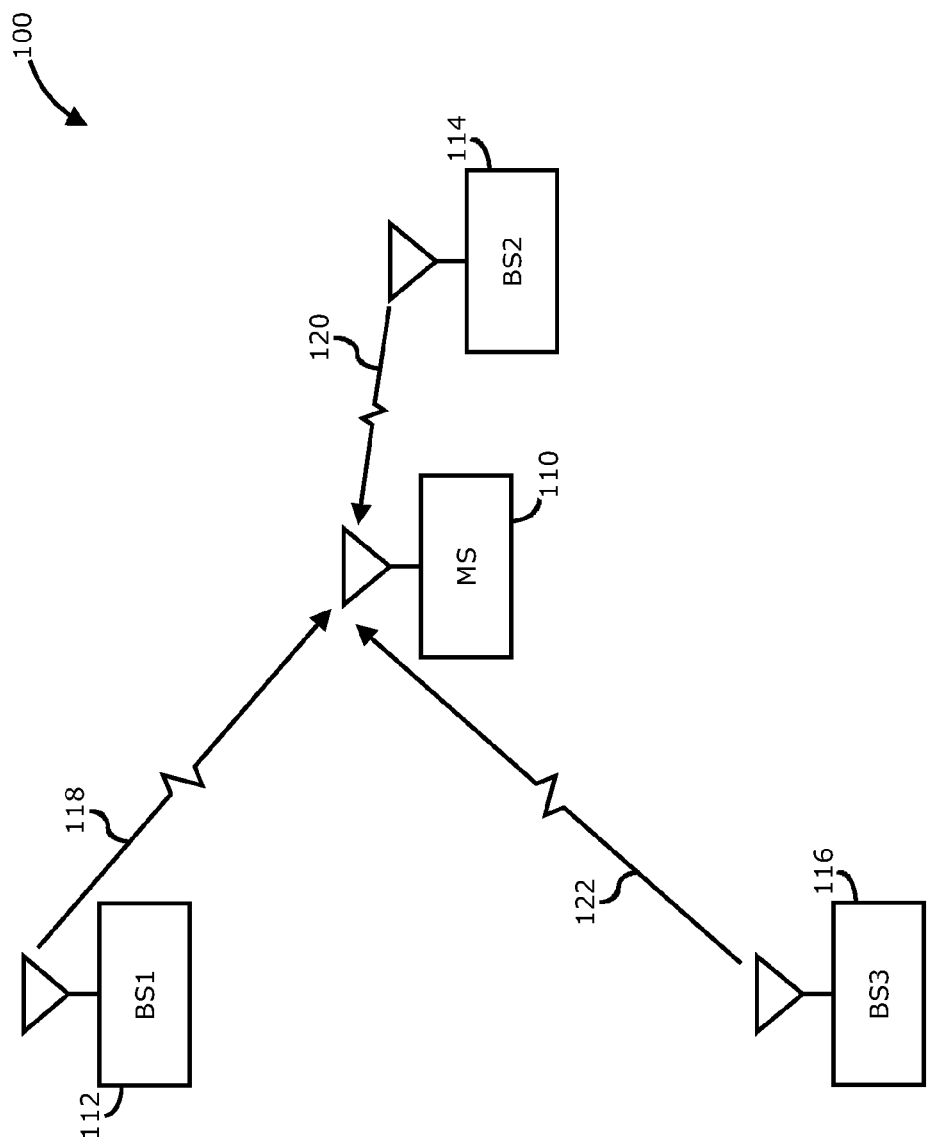
FIG. 1 is a block diagram of a location based services (LBS) system in accordance with one or more embodiments.

Referring now to FIG. 1, is a block diagram of a location based services (LBS) system in accordance with one or more embodiments will be discussed. As shown in FIG. 1, location based services (LBS) system 100 may comprise a mobile station 110 in communication with at least three base stations (or more base stations) or base transceiver stations such as base station (BS1) 112, base station (BS2) 114, and base station (BS3) 116. In one or more embodiments, one or more of the base stations may comprise a relay station, although the scope of the claimed subject matter is not limited in this respect. The base stations may be deployed in a typical hexagonal arrangement of a wireless or cellular network, for example, wherein a hexagon may contain three sectors with a single base station serving a respective sector. For implementing location based services, mobile station 110 may measure the time difference of arrival (or other signal location parameters, for example, angle of departure, received signal strengths, variance of relative time of arrival measurements, and so on) of the signals, signal 118, signal 120, and signal 122, transmitted from the respective base stations to determine a location of the mobile station 110 within the network. Note that to determine geographical coordinates; the mobile station shall be aware about the coordinates of the base stations which signal location parameters were measured. In one of the embodiments the coordinates of the base stations may be delivered to the mobile stations through the MAC layer messages, e.g., LBS-ADV (Location based service advertisement message) or can be delivered to mobile stations through upper layers network TCP/IP or even application layers, etc.

In accordance with one or more embodiments, training signals may be utilized by the base stations to reduce or mitigate interference between the transmitted signals 118, 120, and 122, and to coordinate the transmission of the signals among the various base stations. The design of such a training signal for implementing location based services is discussed further herein, below, and in one or more embodiments the training signal may be integrated within the structure of one or more various wireless network standards such as the Institute of Electrical and Electronics Engineers (IEEE) IEEE 802.16m standard, or Third Generation Partnership Project Evolved Universal Mobile Telecommunications System 3GPP EUTRA specifications for Long Term Evolution (LTE) although the scope of the claimed subject matter is not limited in this respect. It should be noted that although the system 100 of FIG. 1 shows a mobile station 110 receiving signals 118, 120, and 122 from three base stations 112, 114, and 116, respectively, mobile station 110 may receive downlink signals from any number of base stations to implement location based services as described herein, and the scope of the claimed subject matter is not limited in this respect.

In one or more embodiments, the performance of existing preamble or midamble or the pilot-based location based services, referred to as a Basic LBS mode, may be enhanced via utilization of a dedicated downlink LBS structure referred to herein as a Downlink Location Based Services (D-LBS) zone with Location Beacons, referred to as an Enhanced LBS mode. By utilizing a D-LBS zone, location accuracy may be increased via the wireless communication network and may be applied to several various broadband wireless technologies, for example, in the next generation of WiMAX-II type networks or Long Term Evolution (LTE) networks, and/or various Fourth Generation (4G) networks and beyond, and the scope of the claimed subject matter is not limited in this respect. An example of such a wireless network suitable for implementing a D-LBS zone with Location Beacons is shown in and described with respect to FIG. 2, below.

Figure 2:
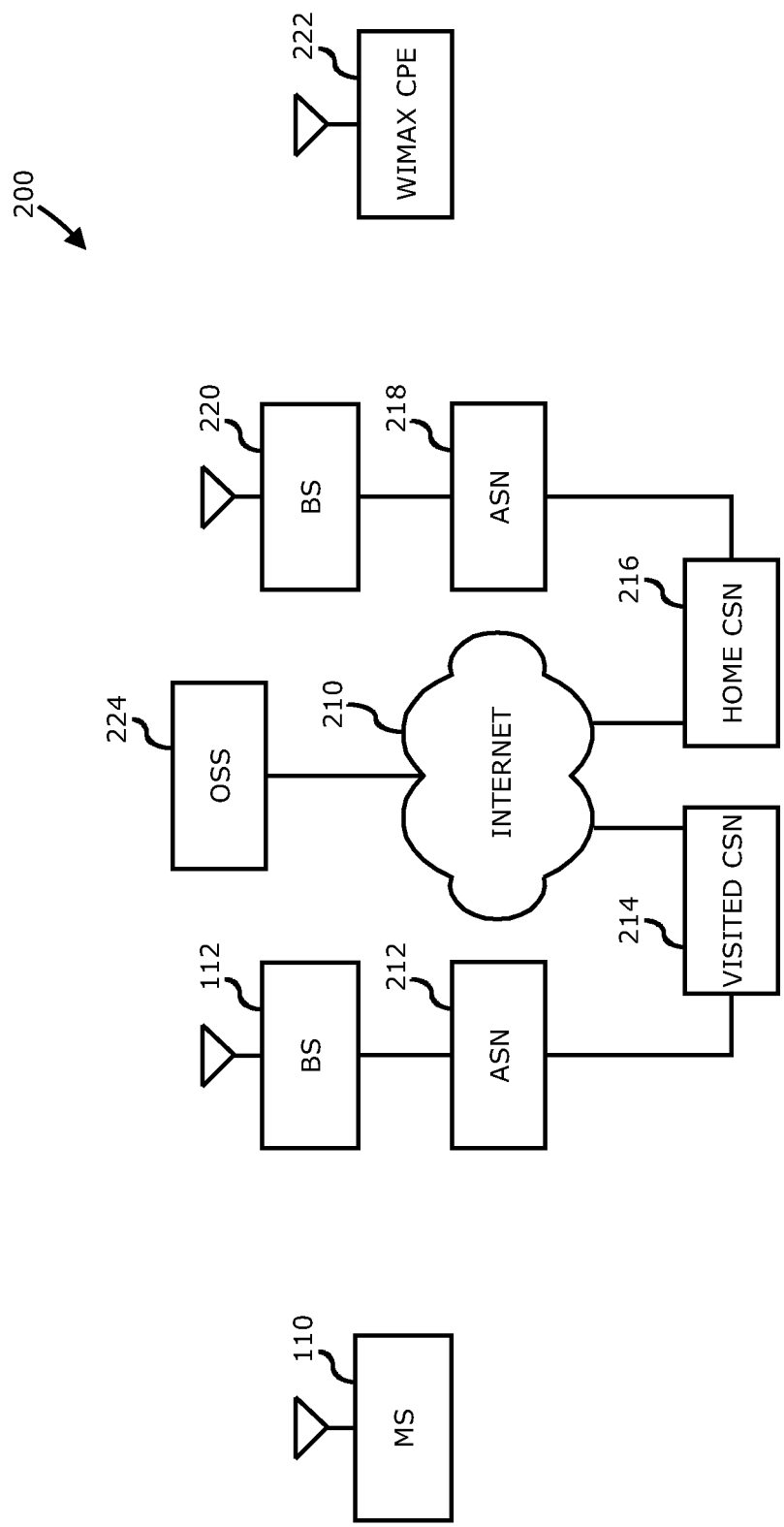
FIG. 2 is a block diagram of a wireless network capable of implementing a Downlink Location Based Services (D-LBS) zone in accordance with one or more embodiments.

Referring now to FIG. 2, a block diagram of a wireless network capable of implementing Downlink Location Based Services (LBS) in accordance with one or more embodiments will be discussed. As shown in FIG. 2, network 200 may be an Internet Protocol (IP) type network comprising an Internet 210 type network or the like that is capable of supporting mobile wireless access and/or fixed wireless access to Internet 210. In one or more embodiments, network 200 may be in compliance with a Worldwide Interoperability for Microwave Access (WiMAX) standard or future generations of WiMAX, and in one particular embodiment may be in compliance with an Institute for Electrical and Electronics Engineers 802.16m standard (IEEE 802.16m). In one or more alternative embodiments network 100 may be in compliance with a Third Generation Partnership Project Long Term Evolution (3GPP LTE) or a 3GPP2 Air Interface Evolution (3GPP2 AIE) standard, and/or any other subsequent generation of wireless network technology, such as 4G and so on. In general, network 200 may comprise any type of physical layer transmission technology (e.g., orthogonal frequency division multiple access (OFDMA) or single carrier frequency division multiple access based wireless network, and the scope of the claimed subject matter is not limited in these respects. As an example of mobile wireless access, access service network (ASN) 212 is capable of coupling with base station (BS) 112 to provide wireless communication between mobile station (MS) 110 and Internet 210. Mobile station 110 may comprise a mobile-type device or information-handling system capable of wirelessly communicating via network 100, for example, a notebook-type computer, a cellular telephone, a personal digital assistant, tablet or pad, or the like. ASN 212 may implement profiles that are capable of defining the mapping of network functions to one or more physical entities on network 100. Base station 112 may comprise radio equipment to provide radio-frequency (RF) communication with mobile station 110, and may comprise, for example, the physical layer (PHY) and media access control (MAC) layer equipment in compliance with an IEEE 802.16m type standard or any other air interface transmission specification or communication standard. Base station 112 may further comprise an IP backplane to couple to Internet 210 via ASN 212, although the scope of the claimed subject matter is not limited in these respects.

Network 100 may further comprise a visited connectivity service network (CSN) 214 capable of providing one or more network functions including, but not limited to proxy- and/or relay-type functions, for example authentication, authorization and accounting (AAA) functions, dynamic host configuration protocol (DHCP) functions, or domain name service controls or the like, domain gateways, such as public switched telephone network (PSTN) gateways or Voice over Internet Protocol (VoIP) gateways, and/or Internet Protocol (IP) type server functions, or the like. These are, however, merely example of the types of functions that are capable of being provided by visited CSN 214 or home CSN 216, and the scope of the claimed subject matter is not limited in these respects. Visited CSN 214 may be referred to as a visited CSN in the case, for example, in which visited CSN 214 is not part of the regular service provider of mobile station 110, for example, in which mobile station 110 is roaming away from its home CSN, such as home CSN 216, or, for example, in which network 100 is part of the regular service provider of mobile station, but in which network 100 may be in another location or state that is not the main or home location of mobile station 110. In a fixed wireless arrangement, WiMAX-type customer premises equipment (CPE) 222 may be located in a home or business to provide home or business customer broadband access to Internet 210 via base station 220, ASN 218, and home CSN 216 in a manner similar to access by mobile station 110 via base station 112, ASN 212, and visited CSN 214, a difference being that WiMAX CPE 222 is generally disposed in a stationary location, although it may be moved to different locations as needed, whereas mobile station may be utilized at one or more locations if mobile station 110 is within range of base station 112, for example. In accordance with one or more embodiments, operation support system (OSS) 224 may be part of network 100 to provide management functions for network 100 and to provide interfaces between functional entities of network 100. Network 200 of FIG. 2 is merely one type of wireless network showing a certain number of the components of network 200; however, the scope of the claimed subject matter is not limited in these respects.

Figure 3:
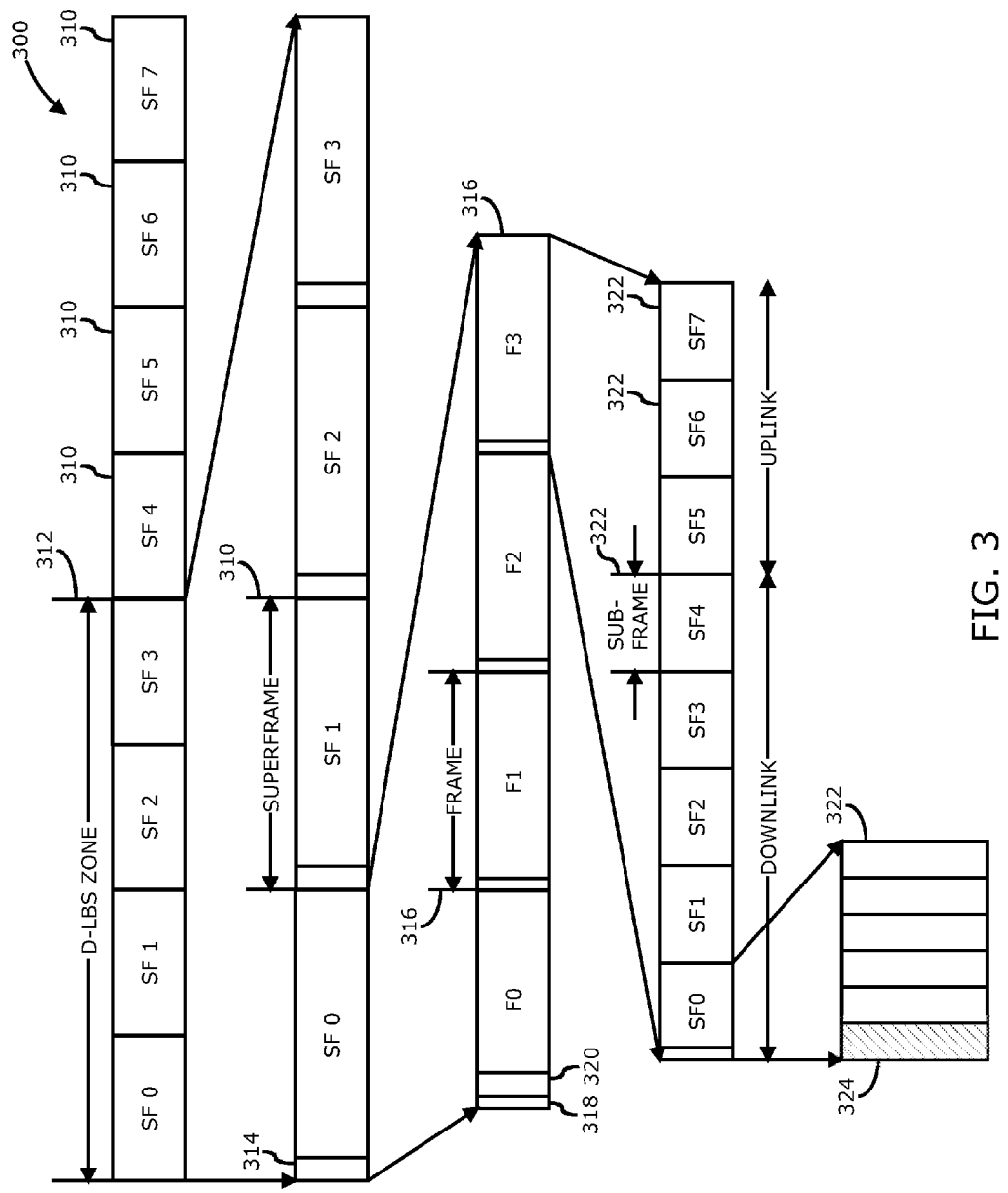
FIG. 3 is a diagram of an implementation of a Downlink Location Based Services (D-LBS) zone in a wireless network in accordance with one or more embodiments.

Referring now to FIG. 3, a diagram of an implementation of a Downlink Location Based Services (D-LBS) zone in a wireless network in accordance with one or more embodiments will be discussed. For purposes of example, a IEEE 802.16m advanced air interface basic frame structure 300 is shown in FIG. 3. As shown in FIG. 3, the enhanced LBS support in downlink involves coordinated transmission of special location beacons across multiple Advanced Base Stations (ABSs) (using terminology of the IEEE 802.16m standard) or eNodeB (using terminology of 3GPP EUTRA technology) in a designated Downlink LBS (D-LBS) zone to facilitate more accurate measurements of signal location parameters used for positioning of mobile station, Advanced Mobile Station (AMS) in case of the IEEE 802.16m terminology or User Equipment (UE) in case of 3GPP EUTRA LTE terminology.

In one or more embodiments as shown in FIG. 3, using the IEEE 802.16m standard as an example, the air interface basic frame structure 300 comprises a series of superframes 310, for example, eight superframes SF 0 through SF 7. The duration of a D-LBS zone 312 may span, for example, four consecutive superframes 310, superframes SF0 through SF3. Each of the superframes 310 may have a 20 millisecond (ms) length and is divided into four equally-sized radio frames 316 of 5 MS in length. A superframe 310 may comprise a superframe header 314 and may comprise four frames 316, frames F0 through F3. In turn, each radio frame 316 comprises multiple subframes 322 consisting of 5, 6 or 7 or other number of orthogonal frequency-division multiplexing (OFDM) symbols, depending on subframe type. Each downlink (DL) frame comprising subframes 322 SF0 through SF3 may be started from synchronous preamble transmission. Two types of Advanced Preambles (A-Preamble) may be defined for the radio frames 316: a primary advanced preamble (PA-Preamble) 320 and a secondary advanced preamble (SA-Preamble) 318. The PA-Preamble 320 is represented by the same sequence transmitted by all stations of the network and thus is not appropriate for the purpose of location parameters measurements. In the IEEE 802.16m standard, the SA-Preamble 318 defines 756 unique sequences represented by IDcell number that should be assigned to base stations 112 and/or sectors during deployment to identify and/or differentiate base stations 112. These signals as well as MIMO-midamble signals can be used in a Basic LBS mode. In one or more embodiments, the SA-Preamble 318 may be suitable for measurement of signal location parameters in a similar way as implemented in the previous generation of the WiMAX system. In an Enhanced LBS mode, the additional dedicated D-LBS zone with Location Beacons may be designed and may consume the entire downlink subframe 322. Alternatively, the dedicated D-LBS zone with Location Beacons may spread over available downlink frame resources. For example, to simplify measurements of location parameters, the particular frame resources, such as symbols, orthogonal subcarriers sets, and so on, on which D-LBS zone Location Beacons 324 are transmitted may be predefined and known to the mobile stations 110. For example, base stations 112 that are configured to support a D-LBS zone 312 may coordinate and transmit Location Beacons 324 in accordance with assigned D-LBS zone transmission plans that may be either known or reproduced at the mobile station 110. For example, location beacon transmission plan in D-LBS zone may be defined by the network or specified by the standard. In one or more other embodiments, allocation of D-LBS zone Location Beacons 324 may be acquired by explicit detection by the mobile station 110 during receive signal processing. In such cases, for more accurate signal location parameters measurements, the data traffic should not be allocated in the D-LBS zone 312, although the scope of the claimed subject matter is not limited in these respects.

In one or more embodiments, when the D-LBS zone 312 is activated, the first symbol of the first subframe 322 (SF0) of the last frame 316 (F3) of a superframe 310 that belong to D-LBS zone (superframes SF 0 through SF 3) may be replaced by a location beacon 324. FIG. 3 shows such an example of the D-LBS zone allocation. In superframes 310, where the D-LBS zone 312 is allocated, the first frame symbols may be represented by the following pattern of synchronization signals: S-P-S-L, in which S stands for SA-Preamble 318 transmission in the first and the third frame 316 of the superframe 310, P stands for PA-Preamble 320 transmission in the second frame 316 of the superframe 310, and L denotes location beacon 324 transmission in the last frame 316 of the superframe 310. To enable enhanced location determination, a dedicated Downlink LBS zone (D-LBS zone) 312 may be defined to transmit location beacons 324 to be received by advanced mobile stations 110 (AMS) and facilitate their measurement of location related parameters (RD, RID, RSSI, and so on) with higher accuracy. Such a dedicated D-LBS zone, when supported, may be spread over four consecutive superframes. The location beacon 324 may be transmitted on the first symbol of the subframe of the last frame of each D-LBS zone superframe. The advanced base stations (ABS) and/or advanced relay stations (ARS) configured to support the D-LBS zone 312 may coordinate and transmit location beacons 324 in accordance with a predefined transmission plan.

In one or more embodiments, the SA-Preamble 318 may be utilized as a reference location beacon signal 324 for transmission inside of the D-LBS zone 312. The physical structure of the SA-Preamble 318 signal transmitted by each advanced base station 112 and/or advanced relay station in the D-LBS zone may be the same as for given frame. In one or more embodiments, the advanced base stations 112 and/or advanced relay stations may transmit the corresponding SA-Preamble 318 signal in the D-LBS zone 312 in accordance with the predefined transmission plan that may depend on the IDcell value assigned to the particular base station 112 or relay station. The location beacon transmission plan provides the time-multiplexed transmission of these signals across neighboring base stations 112 and/or relay stations to facilitate detection and measurements of the relevant signal location parameters from several base stations 112 and/or relay stations. The D-LBS zone transmission plan spreads location beacon transmissions from different base stations 112 and/or relay stations over the D-LBS zone orthogonal or quasi orthogonal resources, for example, different subcarrier sets, different symbols in time, different CDMA codes and/or spatial transmit beamforming vectors.

In general, in one or more embodiments a D-LBS zone 312 may be configured for support of either regular periodic or event-triggered transmission modes. In the Periodic Mode, the D-LBS and associated Location Beacons may be transmitted periodically in time according to a defined period that may be broadcasted by the base stations 112. In the Event-Triggered mode, the D-LBS zone and associated Location Beacons may be transmitted for a finite window of time the start and duration of which may be defined by the base stations 112 or network service providers. Within this window of time the D-LBS zone 312 may also be transmitted periodically, with a period defined by the base station 112. The Event-Triggered mode may be triggered by some events, such as a request either by the mobile station 110 or a base station 112 for high accuracy location for emergency and/or other applications, although the scope of the claimed subject matter is not limited in this respect.

In one or more embodiments, D-LBS zone Location Beacons 324 may be represented by the reference signals that are transmitted by different various base stations 112 and/or base station sectors of the network 200 on D-LBS zone resources in accordance with the predetermined transmission plans. In general, any wideband signals and/or sequences with good auto-correlation and cross-correlation properties may be considered as appropriate candidates for utilization as D-LBS zone Location Beacons 324. The Location Beacon 324 signals may identify respective base stations 112 and/or sectors and may be transmitted synchronously at D-LBS zone resources known to the mobile station 110 according to a predetermined transmission plan. In one particular embodiment, the physical structure of Location Beacons 324 may be the same as preamble signal, for example, the SA-Preamble 318, transmitted by each base station 112 of the network. In one or more alternative embodiments, the specific signals designed for accurate extraction of signal location parameters may be utilized, for example, specific positioning-reference signals or any other type of reference signals, such as channel-state information reference signals, common or precoded pilots and MIMO midamble.

In one or more embodiments, to increase accuracy of location parameters measurements, Location Beacons 324 may be transmitted from multiple antennas installed at the base station and/or beamformed to increase signal-to-noise ratio (SNR) at the mobile station 110 receiver side. Additionally, Location Beacons 324 transmitted from multiple antennas may be beamformed in such a way to carry spatial angular information, e.g., angle of departure. In such an arrangement, special codebooks and special antenna arrays may be designed to perform spatial precoding of Location Beacon 324 signals. If transmit signal precoding with angular information is applied, the mobile station may be able to additionally estimate the Angle of Departure (AoD) of Location Beacons to be utilized as a complementary information to enhance performance of positioning algorithms. For example, if an antenna array with four transmit antennas and 0.5 wavelength antenna spacing is utilized, then corresponding codebook precoding vectors may consist of four plane-wave vectors that form beams with 30 degree widths in certain directions. For typical hexagonal deployments using three-sector collocated base stations 112 with 120 degrees coverage per sector, a whole sector may be divided into four angular scanning regions of 30 degrees each. In an example application to WiMAX-II signals, SA-Preamble 318 signals may be utilized as Location Beacons 324 candidates. Those signals may be additionally transmitted inside of the D-LBS zone 312 in accordance with the transmission plan that indicates on which time and frequency resources the Location Beacons 324 signals, specific for particular base station 112, are allocated. In one or more embodiments, the transmission plan may be unique for each particular base station 112 and may depend on base station specific parameters such as IDcell/segment, and so on. Utilization of a D-LBS zone transmission plan may spread synchronous SA-Preamble 318 transmissions from different base stations 112 over different D-LBS zone orthogonal resource, thr example, OFDMA symbols and orthogonal subcarrier sets. Such spreading may be designed to minimize and/or avoid collisions between different base stations 112, and as a result may reduce interference during signal reception and thus increase accuracy and reliability of signal location parameters measurements.

In one or more embodiments, D-LBS zone transmission plans may define rules that may be utilized for coordinated transmission of Location Beacons 324 on D-LBS zone 312 resources. For example, transmission plans may control the allocation of the Location Beacon 324 signal transmitted by a particular base station 112 of the network to specific an OFDM symbol, orthogonal subcarriers sets, spatial beamforming vector and/or signal code sequence. In general, one or more various D-LBS zone 312 transmission plans may be developed and deployed. For example, some predefined or pseudorandom transmission plans can be utilized and may be optimized for specific network deployment scenarios. For purposes of discussion, an example predefined transmission plan and an example pseudorandom transmission plan will be discussed that may be deployed for implementation in cellular broadband wireless network systems, such as network 200 of FIG. 2. The predefined plan maps base station 112 transmission of the Location Beacons 324 to particular OFDMA symbols and subcarrier sets within the D-LBS zone 312 and, as a result, defines regular transmission rules for each allocated D-LBS zone 312. The pseudorandom transmission plan defines a pseudorandom rule that may be used by the base stations 112 and may be known to the mobile stations 110 and used at the receiver side to determine which D-LBS zone 312 resources the Location beacons 324 from given base station are allocated.

In one or more embodiments of a predefined transmission plan, the existing set of SA-Preambles 318 defined in the IEEE 802.16m specification may be partitioned into Q preamble location/LBS groups (PLGs). The IDcells that belong to the i-th PLG (IDcell PLGi) are defined by the equation below:

$$\text{IDcell PLG}_i = 256 \cdot n + \text{Idx PLG}_i$$

in which i indicates the i-th preamble location/LBS group ($PLG_i$), i=0, 1, . . . , Q−1; Q may be set to the number of OFDMA symbols available for transmission of one D-LBS zone ($DLZ_{NS}$); n is the segment index, and IdxPLG is the index belonging to the i-th $PLG_i$ that spans the following set of values [i:Q:255]. To determine the IDcells that belong to i-th PLG, the Idx $PLG_i$ index may start from i and increments by Q up to 255 for each of the segment index n=0, 1, 2. The first symbol of the subframe that carrier the D-LBS zone 312 may be used for normal preamble transmission. The first symbol of the subframe with D-LBS zone may be used for normal preamble transmission. The remaining Q symbols representing D-LBS zone may be occupied for transmission by Q different PLGs. For the case of Q=5, the D-LBS zone 312 predefined transmission plan is specified by Table 1, below.

TABLE 1

Predefined D-LBS zone transmission plan.

| Segment index n (Allocated carrier sets) | D-LBS zone symbol number | | | | |
|---|---|---|---|---|---|
| | 0 | 1 | 2 | 3 | 4 |
| Carrier Set n = 0 | PLG 0 | PLG 1 | PLG 2 | PLG 3 | PLG 4 |
| Carrier Set n = 1 | PLG 1 | PLG 2 | PLG 3 | PLG 4 | PLG 0 |
| Carrier Set n = 2 | PLG 2 | PLG 3 | PLG 4 | PLG 0 | PLG 1 |

In one or more embodiments, the predefined D-LBS zone transmission plan specifies on which orthogonal resource, symbol and carrier set, of the D-LBS zone 312 the location beacon 324 may be transmitted. To define a transmission plan, the existing set of SA-Preambles 318 may be partitioned into Q preamble location groups (PLGs). To determine the PLG index, the following equation may be used:

$$\text{PLG} = \text{mod}(\text{mod}(\text{IDcell}, 256), Q)$$

In some embodiments, the number of preamble location/LBS groups Q may be set to 12, which is equal to the number of orthogonal resources available in one D-LBS zone 312. Table 1, above, determines the predefined D-LBS zone 312 transmission plan that may be used for transmission of location beacons 324. In accordance with the predefined D-LBS zone transmission plan, each advanced base station 112 and/or advanced receiver station may determine the PLG index using the equation, above. The advanced base station 112 and/or advanced relay station may transmit the location beacon signal on corresponding D-LBS zone symbol index s and carrier set n as defined in Table 2, below. The D-LBS symbol index and carrier set on which particular resource the advanced base station 112 transmit location beacons may be determined from the PLG index using the following equation:

$$s = \text{mod}(\text{PLG}, 4);$$

$$n = \text{floor}(\text{PLG}/4)$$

The D-LBS zone symbol index s may be associated with the superframe number using the following equation:

$$s = \text{mod}(\text{Superframe number}, 4)$$

When one station has multiple segments, the all segments may transmit the same SA-Preamble 318 sequence. The SA-Preamble 318 sequence for the purpose of location beacon 324 transmission may be determined by new IDcell value ($\text{IDcell}_{PLG}$) equal to:

$$\text{IDcell}_{PLG} = \text{mod}(\text{IDcell}, 256) + \text{floor}(\text{PLG}/4) \cdot 256.$$

TABLE 2

Example of predefined D-LBS zone transmission plan for IEEE802.16m systems.

| Allocated carrier set | D-LBS zone symbol index s = 0 Mod(Superframe number, 4) == 0 | D-LBS zone symbol index s = 1 mod(Superframe number, 4) == 1 | D-LBS zone symbol index s = 2 Mod(Superframe number, 4) == 2 | D-LBS zone symbol index s = 3 Mod(Superframe number, 4) == 3 |
|---|---|---|---|---|
| Carrier Set n = 0 | PLG = 0 | PLG = 1 | PLG = 2 | PLG = 3 |
| Carrier Set n = 1 | PLG = 4 | PLG = 5 | PLG = 6 | PLG = 7 |
| Carrier Set n = 2 | PLG = 8 | PLG = 9 | PLG = 10 | PLG = 11 |

Note that in accordance with a predefined transmission plan, a base station 112 of the network 200 may transmit its Location Beacon 324 on the specified symbol/carrier set if its IDcell matches to a corresponding PLG and carrier set as shown in Table 2, above.

In one or more embodiments, a pseudorandom transmission plan may be derived using any type of pseudorandom generator. For example, in one embodiment a uniform linear congruential generator (LCG) may be utilized for the transmission plan generation at the base station 112 side. Such an example LCG may be defined by a recursive equation as shown below:

$$X_p = (aX_{p-1} + c) \bmod m$$

in which m—is an LCG modulus, a is an integer multiplier coefficient, c is an increment, X 0—is an LCG initial value (seed), and p is a running index p=1, 2 . . . . In one particular embodiment, the following LCG parameters may be applied for generating pseudorandom transmission plans:

$$m = 2^{12} - 3 = 4093, c = 0, a = 219.$$

although the scope of the claimed subject matter is not limited in this respect. Each base station 112 may determine the position of its Location Beacon 324 signal inside the D-LBS zone using the following procedure:
1. All the times when the superframe count is equal to zero, each station/segment may reset its LCG initial value to the assigned IDcell and add 1 (i.e., set LCG initial value X0=IDcell+1);
2. During each subsequent superframe, one LCG recursion is calculated until the maximum superframe number is reached and the LCG is reset as described in 1;
3. For a D-LBS zone allocated to the p-th superframe, the relative position of the reference signal in D-LBS zone ($DLZ_{SO}$ symbol offset in OFDMA symbol units) may be calculated in accordance with the following equation:

$$DLZ_{SO} = X_p \bmod DLZ_{NS}$$

in which $DLZ_{NS}$ indicates the number of symbols allocated to the one D-LBS zone ($DLZ_{NS}$=5).

In one or more embodiments, in addition to physical (PHY) layer aspects described above, appropriate support from media access control (MAC) layer may be involved to enable an Enhanced LBS mode using a D-LBS zone with Location Beacons. For example, the D-LBS zone configuration parameters may be transmitted to mobile station using MAC messages or physical control channels. For example, the location of the D-LBS Zone within superframe and its transmission periodicity, and transmission mode and location parameters measurement options may be variable parameters in the system that may be signaled to the mobile station 110 through a unicast or a broadcast MAC layer messages. In such embodiments, the parameters included in the D-LBS zone configuration may be as follows:

D-LBS Mode Support Indication
Position of D-LBS Zone in frame structure;
Transmission Mode Periodic, Event-Triggered Mode;
Transmission Plan Predefined or Pseudorandom;
Indicator for Use of Beamformed Beacons, if applied to help with estimation of Angle of Departure (AoD) as complimentary information for location determination; and
The measurement parameters, such as relative delays D-TDOA, angles, received signal strengths indicators and Hybrid metrics, as well as averaging windows.

Using as an example the IEEE 802.16m standard, the part of the configuration parameters required for Enhanced LBS support may be transmitted in SFH subpackets or in AAI-SCD MAC message as well as in LBS related messages such as AAI_NBR-ADV, AAI_LBS-ADV and other relevant messages. In addition, some of the parameters may be delivered through upper layers (transport, network or application layers).

In one or more embodiments, in WiMAX-II systems, such D-LBS system/measurement configuration information, may be added as an optional type/length/value (TLV) to the location based services advertisement (LBS-ADV) message or other broadcast media access control (MAC) messages, and it may also be unicast to the mobile station 110 in the scan response (SCAN-RSP) message or location based services request (LBS-REQ) message. The LBS-ADV is a broadcast message that is sent to the mobile station 110 periodically and is monitored by all the mobile stations 110 having LBS capability and subscribed to at least some LBS services. The same information may be included in an optional TLV for SCAN-RSP or LBS-REQ, which is unicast to the mobile station 110 for triggered-based location as initiated by the mobile station 110 or the network 200.

Figure 4:
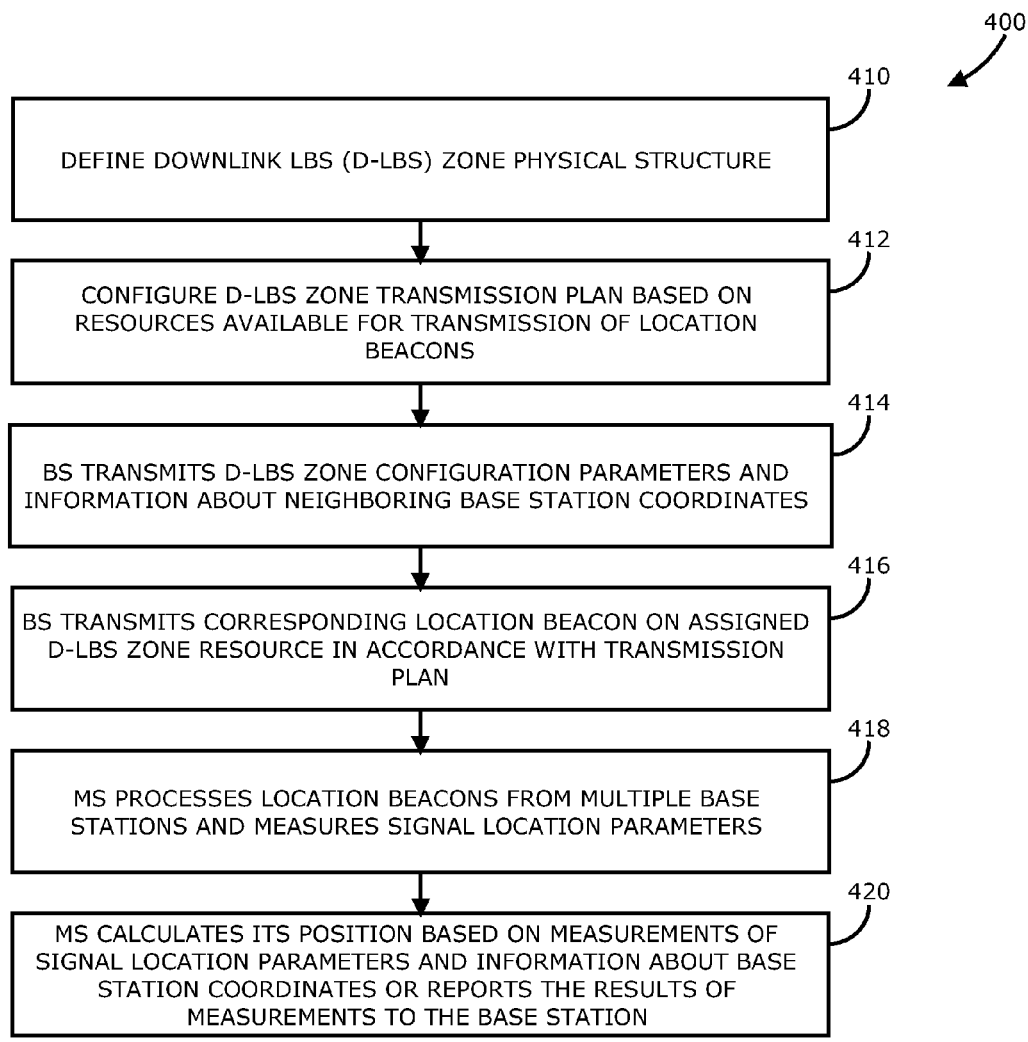
FIG. 4 is a flow diagram of a method of implementing a Downlink Location Based Services (D-LBS) zone according to a predefined transmission plan in accordance with one or more embodiments.

Referring now to FIG. 4, a flow diagram of a method of implementing a Downlink Location Based Services (D-LBS) zone according to a predefined transmission plan in accordance with one or more embodiments will be discussed. Although FIG. 4 shows one particular order of the blocks of method 400, it should be noted that method 400 may include more or fewer blocks than shown, and/or in various other orders, and the scope of the claimed subject matter is not limited in this respect. At block 410, a Downlink Location Based Services (D-LBS) zone physical structure may be defined, for example a transmission period, or resources for transmission of location beacons. At block 412, location beacons and BSs or sectors are assigned to the D-LBS zone resources by forming transmission plan. Different plans can be designed in one or more embodiments. At block 414, a base station 112 may transmit D-LBS zone configuration parameters and information about neighboring base stations, e.g., their coordinates and the assigned identification numbers, e.g., IDcell values. At block 416, base station 112 transmits location beacon on assigned D-LBS zone resource in accordance with defined D-LBS zone transmission plan and the mobile station 110 receives the transmitted location beacons from multiple base stations in the network. At block 418, the mobile station 110 processes the received location beacons and measures signal location parameters from multiple base stations. At block 420, the mobile station 110 then determines its location based on measurements results and information about base station coordinates or reports the requested measurements results to the network to perform positioning.

Figure 5:
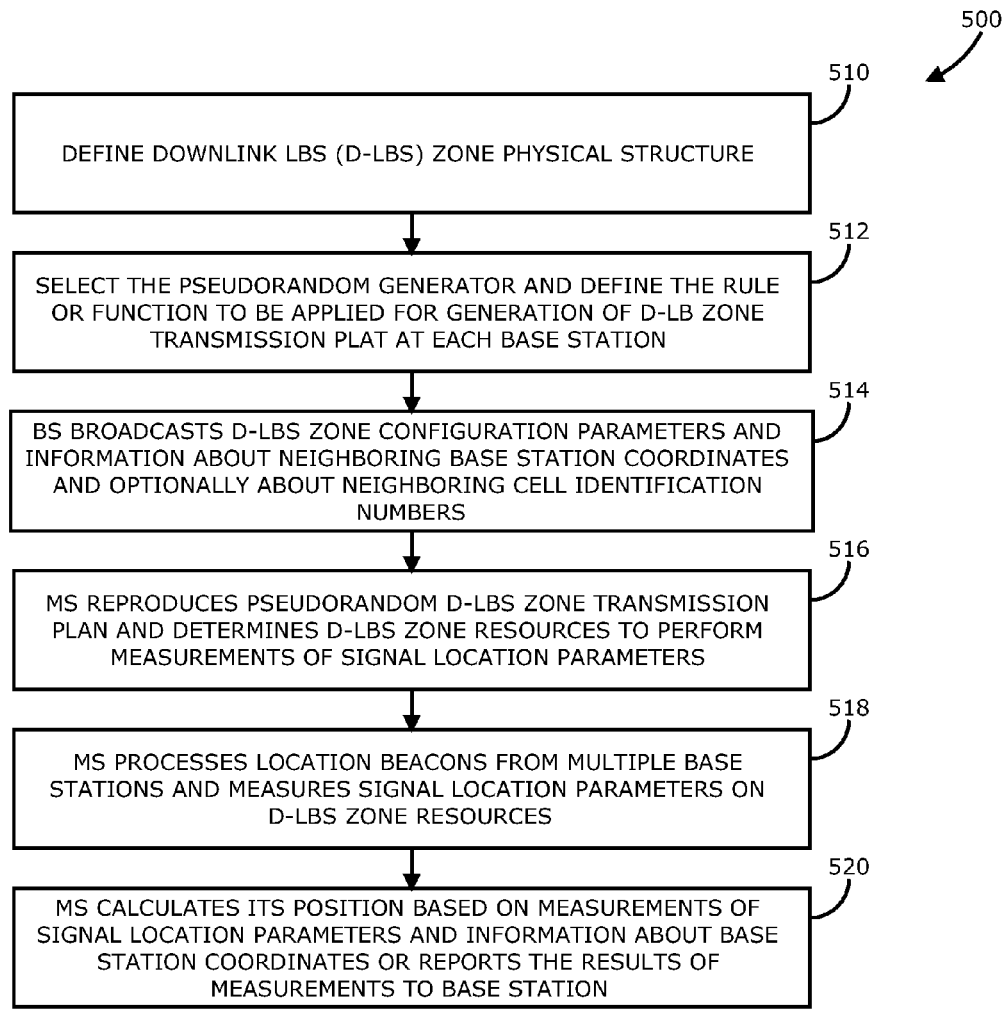
FIG. 5 is a flow diagram of a method of implementing a Downlink Location Based Services (D-LBS) zone according to a pseudorandom transmission plan in accordance with one or more embodiments.

Referring now to FIG. 5, a flow diagram of a method of implementing a Downlink Location Based Services (D-LBS) zone according to a pseudorandom transmission plan in accordance with one or more embodiments will be discussed. Although FIG. 5 shows one particular order of the blocks of method 500, it should be noted that method 500 may include more or fewer blocks than shown, and/or in various other orders, and the scope of the claimed subject matter is not limited in this respect. At block 510, a Downlink Location Based Services (D-LBS) zone physical structure may be defined, for example, a transmission period, or resources for transmission of location beacons (e.g., number of symbols, orthogonal carriers sets). At block 512, a pseudorandom number generator is selected. Different approaches can be used for initialization of pseudorandom generator. For example, the generator seed value may be initialized each time when superframe counter is equal to zero and its initialization may depend on the cell identification number and can be reset to an initial value when the superframe count reaches zero, or can be reset by network command. Any function may be applied to the pseudorandom generator output to assign a location beacon transmission to the particular D-LBS zone resource for given base station. This function can be used to generate D-LBS zone transmission plan. At block 514, a base station 112 may broadcast D-LBS zone configuration parameters and information about neighboring base stations, e.g., their coordinates and the assigned identification numbers (IDcell values), parameters of pseudorandom generator and its physical structure/form. Alternatively, the pseudorandom generator structure and parameters may be defined by the standard. This generator can be used to reproduce the transmission plan within D-LBS zone physical structure for each BS and for each subsequent allocation of D-LBS zone. At block 516, the mobile station 110 reproduces D-LBS zone transmission plan for each base station participating in positioning. The plan can be reproduced by the mobile station if it is aware about the form of the generator, about procedure of its initialization and the function that is used to transform the generator output to the particular D-LBS zone resource. Additionally, mobile station determines D-LBS zone resources on which the signal location parameters will be measured for given base station. At block 518, the mobile station 110 receives location beacons from multiple base stations 112 of the network and performs measurements of signal location parameters for advertised neighboring base stations. At block 520, mobile station 110 then determines its location based on measurements results and information about base station coordinates or reports the requested measurements results to the network to perform mobile station positioning.

Referring now to FIG. 6, a diagram of a comparison of D-TDOA location performance based on SA-preamble signal processing and using a Downlink Location Based Services (D-LBS) zone with location beacons in accordance with one or more embodiments will be discussed. The D-TDOA location performance based on SA-preamble signal processing (Basic LBS mode) and using a Downlink Location Based Services (D-LBS) zone with Location Beacons (Enhanced LBS mode) was analyzed in accordance with the discussed embodiments. The Downlink Location Based Services (D-LBS) zone with Location Beacons as discussed herein was analyzed by extensive link and system level simulations. The evaluation of D-TDOA location accuracy was performed using practical threshold-based matched filtering algorithm for TOA measurements and Taylor-series expansion algorithm for TDOA based positioning. The signal propagation scenario specified in the IEEE 802.16m Evaluation Methodology Document was utilized for analysis of D-TDOA performance characteristics. Conducted system level simulation analysis has shown that the above discussed predefined transmission plan demonstrates similar performance characteristics as the pseudorandom transmission plan. It was also shown that the usage of dedicated a D-LBS zone with Location Beacons may significantly increase performance of location based system 100 and that the Enhanced LBS mode (plots 612 and 614) outperforms the Basic LBS mode, as shown at plot 610, and meets handset based E911 requirements under defined LBS evaluation assumptions.

Referring now to FIG. 7, a block diagram of an information-handling system capable of implementing a D-LBS zone for location based services in accordance with one or more embodiments. Information-handling system 700 of FIG. 7 may tangibly embody one or more of any of the network elements of network 200 as shown in and described with respect to FIG. 2. For example, information-handling system 700 may represent the hardware of base station 112 and/or mobile station 110, with greater or fewer components depending on the hardware specifications of the particular device or network element. Although information-handling system 700 represents one example of several types of computing platforms, information-handling system 700 may include more or fewer elements and/or different arrangements of elements than shown in FIG. 7, and the scope of the claimed subject matter is not limited in these respects.

Information-handling system 700 may comprise one or more processors, such as processor 710 and/or processor 712, which may comprise one or more processing cores. One or more of processor 710 and/or processor 712 may couple to one or more memories 716 and/or 718 via memory bridge 714 which may be disposed external to processors 710 and/or 712, or alternatively at least partially disposed within one or more of processors 710 and/or 712. Memory 716 and/or memory 718 may comprise various types of semiconductor-based memory, for example volatile-type memory and/or non-volatile-type memory. Memory bridge 714 may couple to a graphics system 720 to drive a display device (not shown) coupled to information-handling system 700.

Information-handling system 700 may further comprise input/output (I/O) bridge 722 to couple to various types of I/O systems. I/O system 724 may comprise, for example, a universal serial bus (USB) type system, an IEEE 1394 type system, or the like, to couple one or more peripheral devices to information-handling system 700. Bus system 726 may comprise one or more bus systems, such as a peripheral component interconnect (PCI) express type bus or the like, to connect one or more peripheral devices to information-handling system 700. A hard disk drive (HDD) controller system 728 may couple one or more hard disk drives or the like to information-handling system, for example, Serial ATA type drives or the like, or alternatively a semiconductor-based drive comprising flash memory, phase-change, and/or chalcogenide-type memory or the like. Switch 730 may be utilized to couple one or more switched devices to I/O bridge 722, for example, Gigabit Ethernet type devices or the like. Furthermore, as shown in FIG. 7, information-handling system 700 may include a radio-frequency (RE) block 732 comprising RF circuits and devices for wireless communication with other wireless communication devices and/or via wireless networks, such as network 200 of FIG. 2, for example, in which information-handling system 700 embodies base station 112 and/or mobile station 110, although the scope of the claimed subject matter is not limited in this respect.

Although the claimed subject matter has been described with a certain degree of particularity, it should be recognized that elements thereof may be altered by persons skilled in the art without departing from the spirit and/or scope of claimed subject matter. It is believed that the subject matter pertaining to location determination in wireless communication systems and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. A method, comprising:
configuring a transmission plan for a downlink location based services (D-LBS) zone based at least in part on resources available for transmission of location beacons, wherein the transmission plan comprises a pseudorandom transmission plan that assigns different base stations for transmission on different resources of the D-LBS zone to perform measurements of signal location parameters from multiple base stations or relay stations, or combinations thereof, of a network;
setting a pseudorandom number generator to an initial value that depends on a cell identification if a superframe or a frame count is zeroed;
for subsequently allocated D-LBS zones, calculating a recursion using the pseudorandom number generator and an initial cell identification value of the station;
transmitting configuration parameters for the D-LBS zone from said configuring; and
transmitting one or more location beacon signals on an assigned resource of the D-LBS zone based at least in part on the calculated recursion value.

2. The method as claimed in claim 1, further comprising transmitting information about one or more neighboring base stations coordinates.

3. The method as claimed in claim 1, said transmitting one or more location beacon signals comprising transmitting in a subframe resource, frame resource, or superframe resource, or combinations thereof, in accordance with the transmission plan for coordinated transmission of location beacon signals.

4. The method as claimed in claim 1, wherein a mobile station receiving the one or more location beacon signals has knowledge of the transmission plan.

5. The method as claimed in claim 1, wherein said transmitting one or more location beacon signals includes designating a reference signal unique to a transmitting base station or relay station, or combinations thereof, appropriate for measurement of signal location parameters.

6. The method as claimed in claim 1, wherein the one or more location beacon signals comprise preamble signals, common pilot signals, precoded pilot signals, cell-specific reference signals, multiple-input and multiple-output (MIMO)-midamble signals, or positioning reference signals, or combinations thereof.

7. The method as claimed in claim 1, wherein the configuration parameters comprise signal parameters capable of being measured and used for mobile positioning including time of arrival of the location beacon signals, time difference of arrival of the location beacon signals, received signal powers, received strength indicators, spatial angular information, or channel state information, or combinations thereof.

8. The method as claimed in claim 1, further comprising coordinating said transmitting one or more location beacon signals with the transmission of location beacon signals from other base stations or relay stations, or another source of a reference signal, or combinations thereof, of the network.

9. The method as claimed in claim 1, wherein the D-LBS zone comprises a set of orthogonal or quasi orthogonal frame resources including orthogonal carrier sets, subcarrier sets time intervals, code division multiple access (CDMA) code sequences, or spatial beam forming, or combinations thereof, used for coordinated transmission of location beacon signals.

10. The method as claimed in claim 1, further comprising spreading said transmitting of the one or more location beacon signals that are unique to a transmitter to facilitate identification of the transmitter and to mitigate interference from other transmitters to result in more accurate measurements of signal location parameters.

11. The method as claimed in claim 1, said transmitting one or more location beacon signals comprising transmitting an existing reference signal or a new reference signal, or combinations thereof, for measurement of signal location parameters transmitted in accordance with the transmission plan.

12. The method as claimed in claim 1, wherein the location beacons signals comprise secondary advanced preamble (SA-Preamble) sequences or any other kind of existing reference signal that are transmitted in accordance with the D-LBS zone transmission plan.

13. The method as claimed in claim 12, further comprising using spatial angular information of the location beacon to facilitate determination of angle of departure of the location beam transmission of the base stations.

14. The method as claimed in claim 1, said transmitting one or more location beacon signals on an assigned resource of the D-LBS zone being performed in lieu of existing synchronization signals or downlink control channels, or in the event a specific frame resource is assigned to the D-LBS zone, or combinations thereof.

15. The method as claimed in claim 1, wherein said transmitting one or more location beacon signals occurs periodically, or within a predefined window in response to a triggering event, or combinations thereof.

16. The method as claimed in claim 1, said transmitting one or more location beacon signals comprising using beam forming to carry spatial angular information via spatial precoding of the location beacon to facilitate determination of angle of departure of the location beam transmission.

17. The method as claimed in claim 1, wherein the transmission plan further comprises:
partitioning a set of location beacons into a number of groups based on a number of resources available in the downlink location based services zone; and
assigning a location a beacon that belongs to particular station for transmission on a particular resource of the D-LBS zone using a cell identification number of that station.

18. A method, comprising:
receiving a location beacon transmitted from multiple base stations based at least in part on a transmission plan for a downlink location based services zone (D-LBS) in a signal subframe, frame or superframe structure, or combinations thereof, wherein the transmission plan comprises a pseudorandom transmission plan that includes spreading transmissions of the location beacon that are unique to respective base stations;

partitioning a set of location beacons into a number of groups based at least in part on a number of resources available in the downlink location based services zone (D-LBS);

reproducing the transmission plan at a receiver side to identify on which resources candidate base stations of the D-LBS zone transmit location beacons and to perform measurement of signal location parameters for a set of neighboring base station;

identifying the base stations based at least in part on the respective location beacons and the transmission plan and based at least in art on matching a cell identification of a base station of a corresponding D-LBS zone resource on which a location beacon was received;

measuring signal location parameters of the identified base stations; and identifying a present location based at least in part on the location beacons and the identities of the base stations from which the location beacons were received.

19. The method as claimed in claim 18, wherein the location beacons are received using a physical structure of a secondary advanced preamble, an alternative reference signal, or a predefined reference signal, or combinations thereof.

20. The method as claimed in claim 18, wherein said receiving a location beacon or measuring of signal location parameters, or combinations thereof, occur periodically.

21. The method as claimed in claim 18, wherein said receiving a location beacon or said measuring of signal location parameters, or combinations thereof, occur within a predefined window in response to a triggering event.

22. The method as claimed in claim 18, wherein the transmission plan comprises a predefined transmission plan.

23. An article of manufacture comprising a non-transitory storage medium having instructions stored thereon that, if executed, result in:

configuring a transmission plan for a downlink location based services (D-LBS) zone based at least in part on resources available for transmission of location beacons, wherein the transmission plan comprises a pseudorandom transmission plan that assigns different base stations for transmission on different resources of the D-LBS zone to perform measurements of signal location parameters from multiple base stations or relay stations, or combinations thereof, of a network;

setting a pseudorandom number generator to an initial value that depends on a cell identification if a superframe or a frame count is zeroed;

for subsequently allocated D-LBS zones, calculating a recursion using the pseudorandom number generator and an initial cell identification value of the station;

transmitting configuration parameters for the D-LBS zone from said configuring; and transmitting one or more location beacon signals on an assigned resource of the D-LBS zone based at least in part on the calculated recursion value.

24. The article of manufacture as claimed in claim 23, wherein the instructions, if executed, further result in transmitting information about one or more neighboring base stations coordinates.

25. An information-handling system, comprising:

a processor and a memory coupled to the processor, wherein instructions in the memory configure the processor to:

receive a location beacon transmitted from multiple base stations based at least in part on a transmission plan for a downlink location based services zone (D-LBS) in a signal subframe, frame or superframe structure, or combinations thereof, wherein the transmission plan comprises a pseudorandom transmission plan that includes spreading transmissions of the location beacon that are unique to respective base stations;

partition a set of location beacons into a number of groups based at least in part on a number of resources available in the downlink location based services zone (D-LBS);

reproduce the transmission plan at a receiver side to identify on which resources candidate base stations of the D-LBS zone transmit location beacons and perform measurement of signal location parameters for a set of neighboring base station;

identify the base stations based at least in part on the respective location beacons and the transmission plan;

measure signal location parameters of the identified base stations; and identify a present location based at least in part on the location beacons and the identities of the base stations from which the location beacons were received.

26. A method, comprising:

configuring a transmission plan for a downlink location based services (D-LBS) zone based at least in part on resources available for transmission of location beacons, wherein the transmission plan partitions a set of location beacons into a number of groups based on a number of resources available in the downlink location based services zone, assigns different base stations for transmission on different resources of the D-LBS zone to perform measurements of signal location parameters from multiple base stations or relay stations, or combinations thereof, of a network, and assigns a location a beacon that belongs to particular station for transmission on a particular resource of the D-LBS zone using a cell identification number of that station;

transmitting configuration parameters for the D-LBS zone from said configuring; and transmitting one or more location beacon signals on an assigned resource of the D-LBS zone in accordance with the D-LBS zone transmission plan if the cell identification of the station matches the station in the transmission plan.

27. A method, comprising:

receiving a location beacon transmitted from multiple base stations based at least in part on a transmission plan for a downlink location based services zone (D-LBS) in a signal subframe, frame or superframe structure, or combinations thereof, wherein the transmission plan includes spreading transmissions of the location beacon that are unique to respective base stations, and comprises partitioning a set of location beacons into a number of groups based at least in part on a number of resources available in the downlink location based services zone (D-LBS), and reproducing the transmission plan at the receiver side to identify on which resources candidate base stations of the D-LBS zone transmit location beacons and to perform measurement of signal location parameters for the set of advertised neighboring base station;

identifying the base stations based at least in part on matching a cell identification of a base station of a corresponding D-LBS zone resource on which a location beacon was received;

measuring signal location parameters of the identified base stations; and identifying a present location based at least in part on the location beacons and the identities of the base stations from which the location beacons were received.

* * * * *